US010008058B2

(12) United States Patent
Piche et al.

(10) Patent No.: US 10,008,058 B2
(45) Date of Patent: Jun. 26, 2018

(54) VEHICLE GARAGE DOOR OPENER SECURITY

(71) Applicant: Continental Automotive Systems, Inc., Auburn Hills, MI (US)

(72) Inventors: David R. Piche, Rochester Hills, MI (US); Robert Allen Gee, Lake Barrington, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days. days.

(21) Appl. No.: 14/969,633

(22) Filed: Dec. 15, 2015

(65) Prior Publication Data

US 2017/0169636 A1 Jun. 15, 2017

(51) Int. Cl.
*H04M 1/725* (2006.01)
*G07C 9/00* (2006.01)

(52) U.S. Cl.
CPC ..... *G07C 9/00142* (2013.01); *G07C 9/00039* (2013.01); *G07C 9/00309* (2013.01); *G07C 2009/00928* (2013.01)

(58) Field of Classification Search
CPC .............. G07C 9/00103; G07C 9/0069; G07C 9/00158; G07C 9/00015; E05F 15/2076; G08C 17/02; G08B 13/08; H04M 1/72533; B60R 25/24
USPC ....... 340/5.7, 5.71, 5.2–5.21, 5.54, 5.2–5.22, 340/5.61; 701/49
See application file for complete search history.

(56) References Cited

U.S. PATENT DOCUMENTS 6,100,811 A * 8/2000 Hsu .................... B60H 1/00642 340/426.36
8,981,898 B2 * 3/2015 Sims ...................... G08C 17/02 340/5.2
9,030,293 B1 * 5/2015 Tabak ..................... G06F 21/31 340/5.54
2003/0210131 A1 * 11/2003 Fitzgibbon .............. B60R 25/00 340/5.53
2005/0253710 A1 * 11/2005 Eskildsen .............. G08B 13/08 340/545.5
2006/0238297 A1 * 10/2006 Tang ...................... G08C 17/02 340/5.64
2008/0071546 A1 * 3/2008 Beiermeister ....... B60R 16/0373 704/273
2011/0045872 A1 * 2/2011 Simmons ............... G02B 27/01 455/557
2011/0109431 A1 * 5/2011 Bragagnini ........ G07C 9/00158 340/5.52
2011/0193680 A1 * 8/2011 Summerford .......... G08C 17/02 340/5.51
2013/0027212 A1 * 1/2013 King .................. G07C 9/00182 340/635

(Continued)

*Primary Examiner* — Firmin Backer
*Assistant Examiner* — Munear Akki

(57) ABSTRACT

The integrated garage door opener controller in a vehicle, i.e., a garage door controller embedded in a vehicle, is prevented from operating pending receipt of a personal identification number (PIN) into a display device. In an alternate embodiment, the embedded garage door controller is enabled by information from occupant sensors, which indicate whether a driver or other person in the vehicle previously used the vehicle. In an alternate embodiment, an alarm is transmitted to a telematics service provider after a predetermined number of attempts to unlock the system have been made.

10 Claims, 4 Drawing Sheets

(56) References Cited

U.S. PATENT DOCUMENTS

| | | | | |
|---|---|---|---|---|
| 2015/0228132 | A1* | 8/2015 | Geerlings | G08C 17/02 340/5.22 |
| 2015/0308396 | A1* | 10/2015 | Elzein | F02N 11/0807 455/420 |
| 2016/0104373 | A1* | 4/2016 | Geerlings | H04Q 9/00 340/5.25 |
| 2016/0337502 | A1* | 11/2016 | Buescher, Jr. | H04M 1/72533 |
| 2016/0363991 | A1* | 12/2016 | Schlecht | G06F 3/011 |

* cited by examiner

VEHICLE GARAGE DOOR OPENER SECURITY

BACKGROUND

A garage door opener is a motorized device that opens and closes a garage door. Most openers are controlled or operated by a wall-mounted switch. Most openers are also operable by a wireless remote controller, i.e., a "remote" or simply remote controller, which is a small, hand-held device that can be carried by a person or operated from a motor vehicle.

Put simply, a garage door remote controller is a small, battery-powered radio frequency transmitter that transmits a signal on one or more designated frequencies. When a mating receiver in the garage door opener "hears" a signal from the remote controller, the garage door opener raises or lowers the garage door, allowing or denying access to the garage itself of course but any building(s) connected thereto.

Many vehicles are now manufactured with integrated garage door opener controllers, which can "learn" or be programmed to transmit a signal to a variety of different types of garage door openers. Such integrated garage door openers are typically designed to be functional, regardless of whether the vehicle is on or off.

While integrated garage door openers reduce clutter in a vehicle, their continuous operability provides a means by which someone can gain entry to a garage and thus a home or other structure simply by gaining entry to the vehicle. Preventing unauthorized use of a vehicle's embedded garage door opener controller, i.e., providing security to an integrated garage door opener would thus be an improvement over the prior art.

DETAILED DESCRIPTION

As used herein, the term "telematics" refers to vehicular technologies and systems that enable a motor vehicle to send data to and receive data from a service provider. The On Star® system that is provided in vehicles manufactured by General Motors is one example of a telematics system. Such systems can provide vehicle tracking, navigation, monitoring of vehicle systems and components and emergency communications. Telematics systems can also remotely control various components and systems.

As used herein, the term "sensor" refers to a device that responds to a physical stimulus, such as heat, light, sound, pressure or a particular motion and transmits a resulting signal representative of the stimulus.

As noted above, a garage door opener comprises a mechanism that is located inside a garage and which is capable of opening and closing a garage door in response to radio frequency signals received by a radio frequency received coupled to or forming part of the garage door opener. Such radio frequency signals are transmitted by a wireless remote controller for the opener. As also noted above, many vehicles are now manufactured with embedded or integrated wireless remote controllers, i.e., remote controllers embedded in the vehicle. Such controllers are typically operated by depressing one or more pushbuttons located on the vehicle's instrument panel, a visor or rearview mirror.

In addition to embedded remote controllers, many vehicles also include various types of sensors. Such sensors include seat position detectors capable of measuring seat height, lumbar support position, headrest position, seat angle, seat length for the behind-the-knee bolster, seat tilt angle, and seat forward-back position and occupant weight. Other sensors include steering wheel angle and column length sensors, mirror position sensors, brake and accelerator pedal height sensors (on vehicles having adjustable pedals) et al. Occupant sensors thus provide information on the settings or configuration of various systems and devices that are used to control a vehicle. The occupant sensors thus provide vehicle control system configuration information that can help identify a person in the vehicle as being someone who was previously operating the vehicle or who is authorized to operate the vehicle and presumably a garage door opener controller. They can thus identify an occupant by how they are configured or set.

Figure 1:
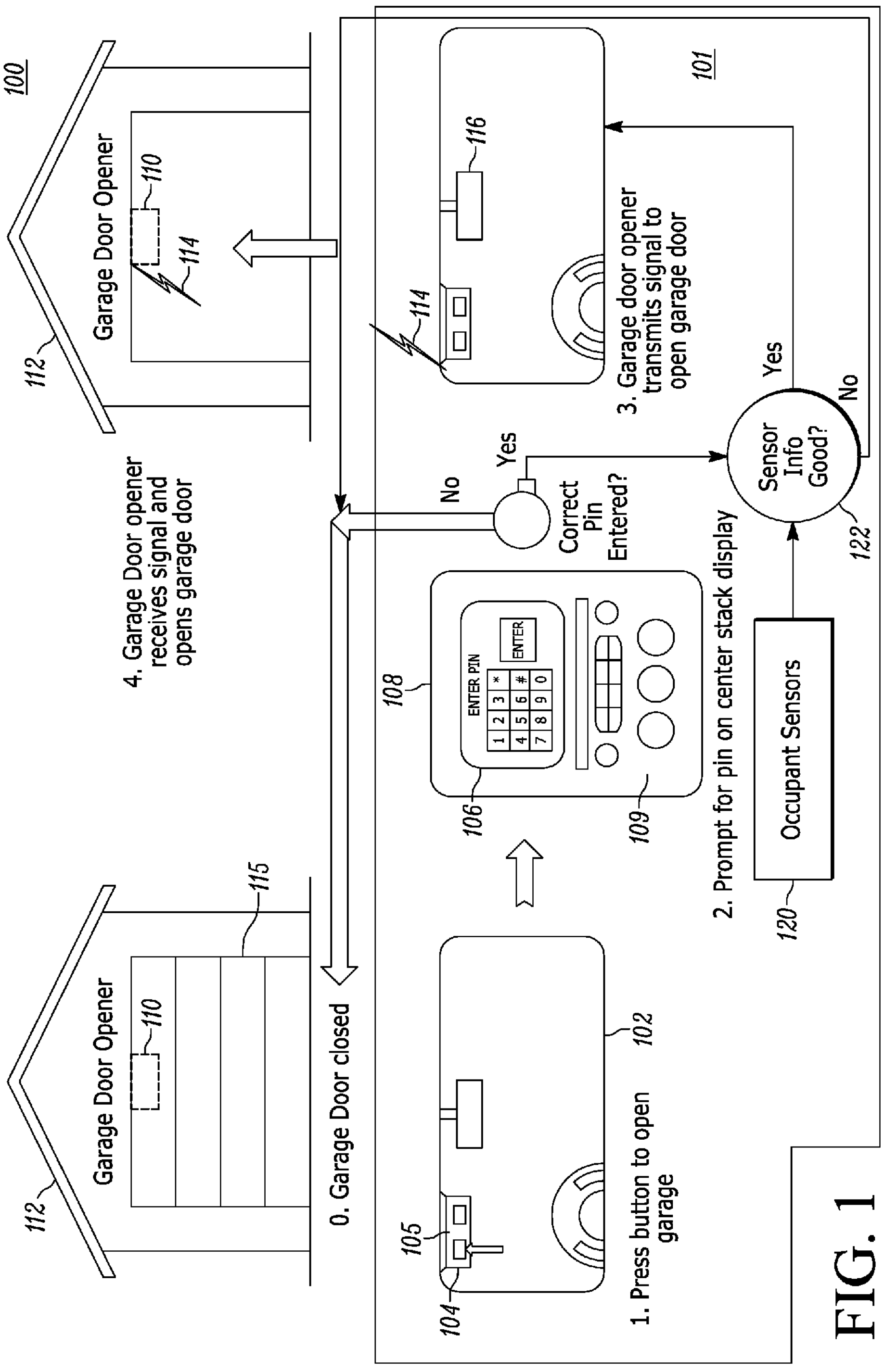
FIG. 1 depicts both a system and method for securing an integrated garage door opener controller in a vehicle.

Referring now to FIG. 1 there is shown a system 100, as well as a method 100, for securing the operation of an integrated garage door opener controller, i.e., a remote garage door controller integrated into a vehicle 101. At a first step 102, the actuation of a push button 104 embedded in a visor 105 of the motor vehicle 101 causes the display of a keypad 106 on a touch-sensitive display device 108 located in the instrument panel 109 of the vehicle 101 or elsewhere it can be reached by a vehicle occupant. The pushbutton 104 that triggers the display of a keypad is one that in prior art vehicles causes the direct or immediate transmission of a radio frequency signal to a garage door opener 110 that would cause the opener 110 to operate, i.e., raise or lower a garage door 115.

In FIG. 1, the keypad 106 that is displayed responsive to actuation of the pushbutton 104 is touch-sensitive. It thus allows entry of one or more digits or alpha-numeric characters into the display device 208, which is of course coupled to a processor, not shown.

If the numbers or characters entered at the displayed keypad 106 by a person in the vehicle identically match a predetermined and pre-stored multi-digit security code or personal identification number (PIN) for the garage door controller 116 in the vehicle 101, and if occupant-identifying information provided to a vehicle computer from various occupant sensors 120 corresponds with previously-stored occupant-identifying information, a determination is made 122 by a processor that the person who entered the PIN for the garage door controller is authorized to operate the garage door. A radio frequency signal 114 is thus transmitted from the vehicle-embedded garage door opener controller 116 which causes the garage door opener 110 in the garage 112 to operate, i.e., raise or lower the garage door 115.

If characters entered at the keypad 106 do not match the PIN, the occupant sensor information is ignored. No signal is transmitted to the garage door opener 110. A closed garage door 115 stays closed or an open garage door 115 stays open.

Put simply, the apparatus and method disclosed herein prevents an integrated garage door opener controller in a vehicle from working unless a multi-digit PIN is entered into a user interface 106 in the vehicle 101 and various information from various vehicle-located occupant sensors is evaluated to determine whether the person who entered the PIN at the display device is likely to be an authorized user of the garage door opener controller. The PIN and sensor information is thus combined or "fused" together.

Figure 2:
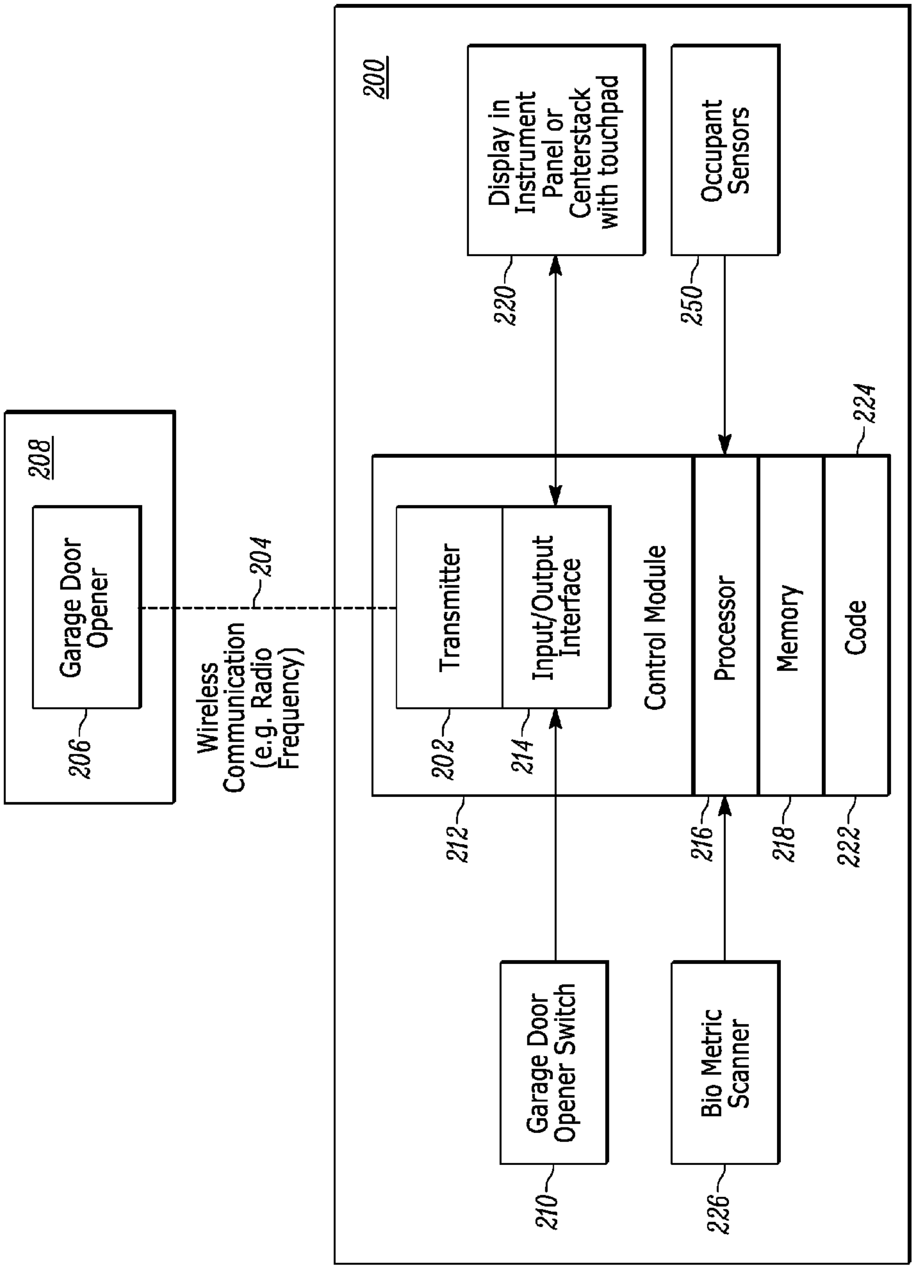
FIG. 2 depicts an apparatus for controlling the operation of an integrated garage door opener controller included in a vehicle.

FIG. 2 depicts a first embodiment of an apparatus 200 for securing or limiting the operation of an integrated garage door opener controller 202 in a vehicle. The apparatus comprises of course a low-power, low-frequency radio frequency transmitter 202, also referred to herein as a garage door opener controller.

The transmitter 202 is configured to transmit a wireless signal 204, which when received by a garage door opener 206, causes the garage door opener 206 to operate, i.e., open or close, a garage door that is connected to the garage door opener 206. Stated another way, the transmitter 202 is a conventional remote garage door opener controller, albeit one that is embedded or integrated into a motor vehicle.

The apparatus 200 in FIG. 2 also comprises a switch 210, typically a push button switch located in the vehicle's visor, on the rear view mirror or elsewhere. In the prior art, operation of such a switch would cause the immediate transmission of a signal to a garage door opener that would cause the opener to operate. In the apparatus shown in FIG. 2, however, operation of the switch 210 provides a signal to an input output interface 214 of a control module 212, which initiates a process that displays a keypad on a touch-sensitive display device 220 by which a PIN known only to authorized users can be entered and thus provided to a controller or processor 216.

In FIG. 2, the processor 216 is part of a control module 212. At least one of the processor 216 and the control module 212 additionally comprise non-transitory memory 218 in which executable program instructions and data are stored.

The processor 216, which is also coupled to the transmitter 202, a display panel 220 and an optional biometric scanner 226, executes program instructions stored in the memory 218. The processor and instructions thus effectively define or provide functionality of the apparatus 200 described hereinafter.

Program instructions stored in the memory 218 cause the processor 216 to monitor the state of the aforementioned garage door opener switch 210. When the switch 210 is actuated, the actuation sends an electrically-measurable signal to the processor 216 which hin turn causes the processor 216 to execute program instructions stored in the memory device 218 by which the processor 216 "take controls of" the touch sensitive display panel 220, typically mounted in the instrument panel of a vehicle, and thus display a keypad or other type of an icon on the panel 220 the selection(s) or actuation.

Selection or actuation of a displayed icon or key on the panel 220 causes corresponding information to be sent from the panel 220 to the processor 216 as "input." Inasmuch as the display panel 220 is touch sensitive, the display panel 220 is able to generate electrical signals responsive to tactile inputs to the display panel 220. Such signals are provided to and accumulated by the processor 216.

Instructions stored in the memory device 218 cause the processor 216 to receive and store in the memory 2198, inputs that the processor 216 receives from the touch-sensitive display device 220 and accumulate those inputs until the processor 216 receives a termination signal from the display panel 220, e.g., an "enter" or "return" button, indicating that no further digits will be input to the display panel 220 by a user.

Upon receipt of the characters from the display device 220, program instructions stored in the memory device 218 cause the processor 216 to compare the characters that were input to the display device 220 (and received therefrom by the processor 216) and, compare those input characters to a pre-determined, pre-stored access code or PIN 222, preferably known only to authorized users of the vehicle, the garage or both.

The PIN 222 stored in one or more locations 224 of the non-transitory memory 218 is not the code or string, which when transmitted from a garage door remote controller causes the garage door opener to operate. Most of those codes are "rolling" codes that change on each actuation of a controller. The PIN 222 stored in the non-transitory memory 218 is instead a fixed string of alphanumeric characters.

If the characters received at the display device 220 are determined by the processor 216 to exactly match the pre-determined PIN 222, program instructions stored in the memory device 218 cause the processor 216 to query one or more occupant sensors 250 for information that can help determine whether the person who entered the correct PIN number at the display panel 220 is indeed authorized to operate a garage door opener.

Occupant sensors 250 are known and described above. They include, but are not limited to, seat position detectors capable of measuring seat height, lumbar support position, headrest position, seat angle, seat length for the behind-the-knee bolster, seat tilt angle, and seat forward-back position and occupant weight. Other sensors include steering wheel angle and column length sensors, mirror position sensors, brake and accelerator pedal height sensors (on vehicles having adjustable pedals). The combination of a correct PIN and occupant sensor information that indicates that a vehicle occupant is known to the vehicle increases the likelihood that the occupant who provided the PIN is in fact an authorized user of the garage door opener.

Program instructions in the memory 218 cause the processor to evaluate information from the occupant sensors 250. Upon a determination that an entered PIN is correct and the occupant sensors' information indicates that an authorized person is in the vehicle, program instructions cause the processor 216 to take control of the transmitter 202 and thereby cause the transmitter 202 to transmit a wireless signal 204 that includes a code, which when received by the garage door opener 206 causes the opener 206 to operate, i.e., open or close the garage door. Stated another way, when a valid PIN 222 is entered at the display device and an authorized user is determined by occupant sensors to be the person who entered the PIN, an operation signal is transmitted to the garage door opener. Conversely, if the PIN received at the touch sensitive display device 220 is not identical to the pre-determined, pre-stored PIN 222, or if the PIN is correct but occupant sensors indicate that the person in the vehicle is unknown, no signal is transmitted to the garage door opener 206. An error message is optionally generated by the processor 216 and displayed on the display device 220.

Put simply, the apparatus 200 shown in FIG. 2 requires the entry of a personal identification number (PIN) or access code into an input device 220, and objective indications of the person's previous occupancy from occupant sensors in order to cause the transmission of a signal 204 to a garage door opener 206.

Those of ordinary skill in the art might recognize that a finite-length personal identification number (PIN) or access code, typically four to eight characters in length that is required to operate the transmitter 202 of an integrated garage door opener controller can be determined by trial and error. The embodiment shown in FIG. 2 is therefore configured to limit the number of times that characters or other forms of input can be entered into the display device 220. When that number of attempts is reached, program instructions stored in the memory device 218 cause the processor to wait for the vehicle to be started until accepting PINs at the display device 220.

In an alternate embodiment, a biometric scanner 226 is coupled to the processor 216 in order to provide yet another additional layer of security to the garage door operation.

A biometric scanner 226 can be one or more of a fingerprint reader mounted on an instrument panel, a retinal scanner mounted to a rear-view mirror or visor or a voice scanner.

Biometric scanning is well known in the art. Further description of the biometric scanner(s) is therefore omitted in the interest of brevity.

In an alternate embodiment that employs biometric scanning, one or more biometric characteristics of authorized users are stored in the memory device 218. In such an embodiment, which does not consider signals from occupant sensors 250, the failure to receive a biometric characteristic that matches a previously-stored biometric characteristic 228 inhibits the apparatus 200 from receiving additional PINs at the display device 220.

Figure 3:
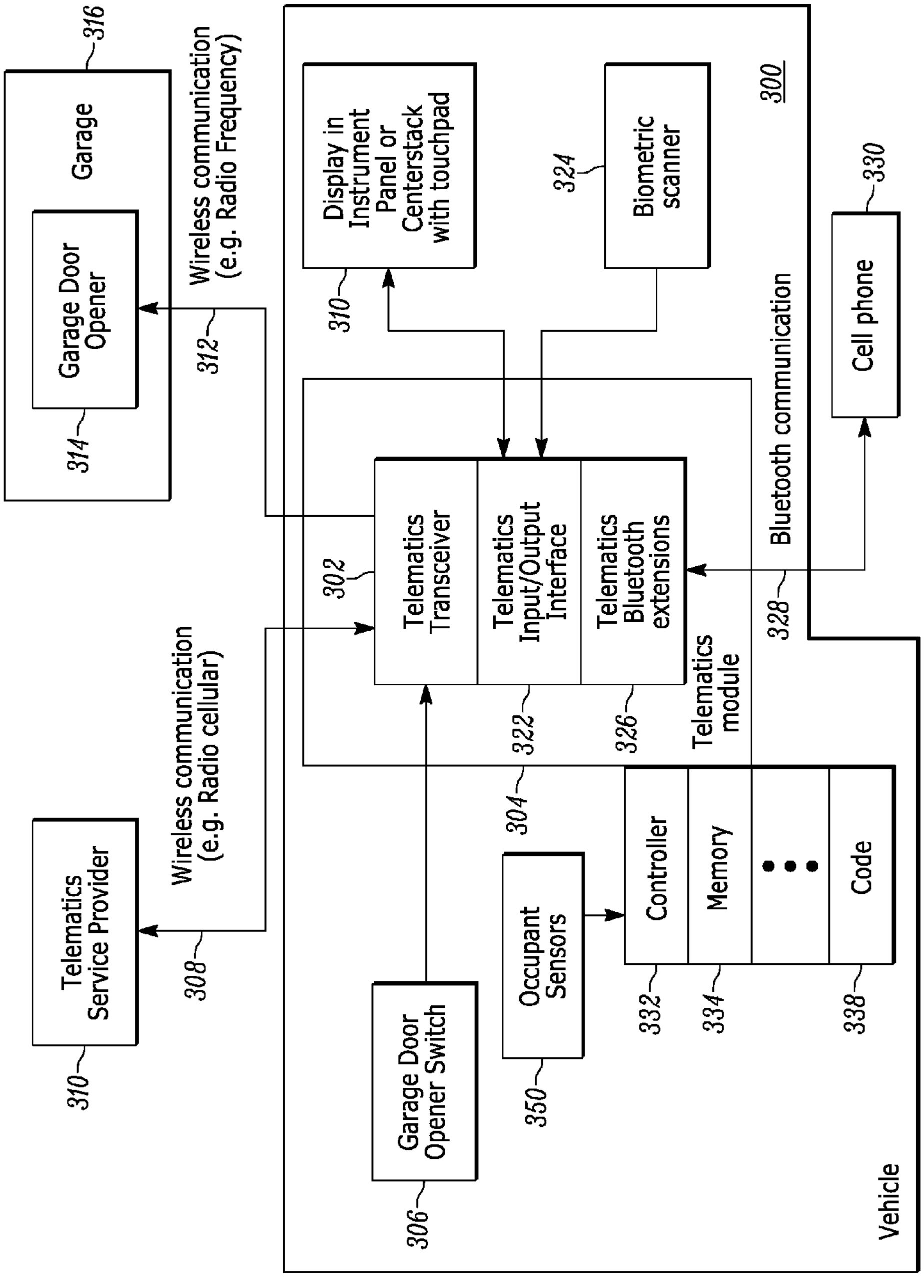
FIG. 3 depicts another apparatus for controlling the operation of a garage door from a vehicle and which is capable of retrieving the garage door access code from a telematics service provider.

FIG. 3 depicts another embodiment of an apparatus 300 for securing the operation of an integrated garage door from a vehicle. The apparatus 300 shown in FIG. 3 differs from the embodiments discussed above by the inclusion of a telematics transceiver 302, which is part of a conventional telematics module 304.

As shown in FIG. 3, the telematics transceiver 302 is coupled to a garage door opener controller switch 306, which is simply an integrated push-button switch, typically located in or part of the instrument panel of a vehicle, a visor, a rear-view mirror or elsewhere. In a prior art vehicle, actuation of such a switch, regardless of its location, would cause an immediate transmission of a signal to a garage door opener that would cause the opener to open or close a garage door.

Unlike prior art telematics transceivers that consist essentially of a cell phone, the transceiver 302 shown in FIG. 3 comprises a low-power, low-frequency radio frequency (RF) transmitter configured to be “universal” garage door opener controller. It can “learn” various signals and codes required by various different garage door openers 314.

The telematics transceiver 302 comprises a radio frequency transceiver configured to transmit and receive wireless to and from a telematics service provider 310, examples of which include General Motors’ On-Star® and Hyundai Motors’ Blue Link® systems. The preferred telematics transceiver 302 is thus a multi-function device but alternate embodiments include of course separate telematics transceivers and a separate garage door transmitter.

Similar to the embodiment shown in FIG. 2, the apparatus 300 shown in FIG. 3 comprises a processor 332 that executes instructions stored in a non-transitory memory device 334. In FIG. 3, the processor 332 is “configured” to receive or detect the actuation of the garage door opener switch 306. As with the embodiment shown in FIG. 2, the processor 332 also receives information from one or more occupant sensors 350. As described above, the occupant sensors 350 provide information on configurations or settings of various different types of vehicle equipment, and which can indicate who is present in the vehicle.

As with the embodiments described above, upon actuation of the switch 306, the processor 332 causes the display of a keypad or other comparable icon 318 on a touch sensitive display device 320. The switch actuation also causes the processor 332 to collect occupant sensor information. The processor 332 thus sends control signals to and receives information from the touch sensitive display, and receives occupant sensor information, responsive to instructions stored in the memory device 334 that are executed when the switch 306 is actuated. The information that is exchanged between the processor and display device passes through a telematics input/output interface 322.

Still referring to FIG. 3, a Bluetooth transceiver 326 provides a conventional Bluetooth communications link 328 between a mobile cell phone 330 inside the vehicle and the telematics module 304. In the preferred, the controller 332, which is coupled to a non-transitory memory device 334, executes program instructions stored in the memory device 334 that cause the controller 332 to exercise control over the various devices described above, including the Bluetooth transceiver 326.

Similar to the embodiment shown in FIG. 2, instructions stored in the memory device 334 of FIG. 3 cause the controller 332 of FIG. 3 to monitor the switch 306 of FIG. 3. And, similar to the embodiment shown in FIG. 2, when the garage door opener controller switch 306 is actuated, instructions in the memory device 334 cause the processor 332 to generate and display a keypad or other series of icons on the touch sensitive display device 320, the actuation of which is detected and received by the controller and accumulated as inputs from the touch sensitive display device 320.

When one or more characters or other input signals are received from the display device 320 by the controller 332, the controller 332 compares the received input signals to a pre-determined personal identification number or PIN 338, which is stored in the memory device 334. If the one or more digits or other characters or other information input from the display device 320 identically matches the PIN 338 stored in the memory device 334, program instructions stored in the memory device 334 cause the controller 332 to compare the occupant sensor information to previously-stored reference values for the various sensors. If the PIN entered at the display device matches a pre-stored PIN and if occupant sensor information indicates that a valid user is in the vehicle, the telematics transceiver 302 (or an associated transmitter) transmits a signal to the garage door opener 314 that causes the garage door opener 314 to operate.

The Bluetooth link 328 enables a cell phone 330 to be wirelessly coupled to the telematics module 304. Unlike the apparatus shown in FIG. 2, program instructions stored in the memory device 334 of FIG. 3 enable the controller 332 of FIG. 3 to communicate bi-directionally with a cell phone 330 using the Bluetooth communication link 328.

In the preferred embodiment, program instructions stored in the memory 334 permit a cell phone 330 coupled to the telematics module 304 through the Bluetooth transceiver 326 to send signals to the transceiver 326 which correspond to or which are functionally the same as the actuation of the garage door opener switch 306. Similarly, the cell phone 330 and its wireless communications link enable the cell phone 330 and its associated display device to duplicate the functionality of the touch-sensitive display device 320 located in the vehicle’s instrument panel. The cell phone 330 and the Bluetooth communications link 328 thus enable the cell phone 330 to request actuation of a garage door opener, display a keypad to which a personal identification number or PIN can be entered and by which a garage door opener can be operated by controlling an integrated garage door opener part of a vehicle. Stated another way, the Bluetooth link 328 enables a cell phone to assume the role of the garage door opener remote control and an input device that can receive a secret PIN or user ID, the receipt of which enables the remote control to operate.

In another embellishment, when a pre-determined number of incorrect or invalid PINs are provided at either the display device 320 or a cell phone coupled via the Bluetooth communications link 328, the controller 332 is configured to direct the telematics transceiver 326 to transmit an alarm message 308 to a telematics service provider 310. The alarm message 308 notifies the telematics service provider 310 that an unauthorized person is attempting to gain access to a garage using the vehicle's built-in garage door opener controller. In such an embellishment, program instructions stored in the memory device 334 cause the controller 332 to assume control of the telematics transceiver 326, monitor communications with a cell phone 330 as well as the display panel 320, detect the receipt of information-bearing signals from the cell phone 330 and panel 320 from which the controller 332 can determine that the numbers being entered into the phone or the panel are invalid. A telematics service provider 310 can thereafter notify law enforcement and/or the vehicle's owner/operator.

Figure 4:
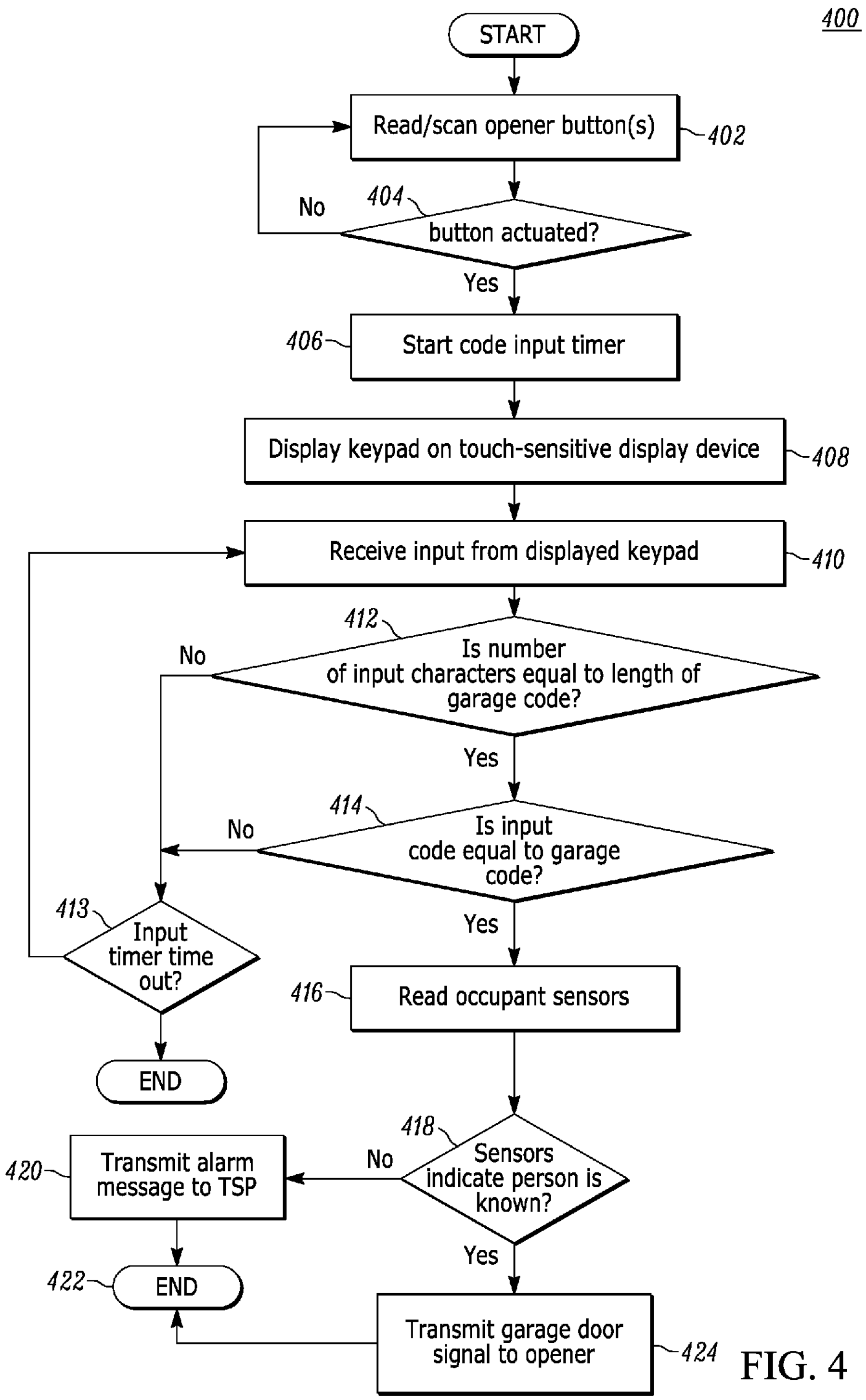
FIG. 4 depicts steps of a method of controlling the operation of a garage door opener controller from a vehicle.

FIG. 4 depicts steps of a method 400 for controlling the operation of a garage door opener controller that is integrated into a vehicle. In the first two steps 402, 404 one or more integrated switches in a vehicle are continuously scanned until one of them is detected as being actuated. After a switch is actuated as determined at step 404, a timer is started at step 406, which limits the time during which an access code can be entered at a display device and thus cut off or cut short the amount of time a thief would have to determine a garage door access code by trial and error.

At step 408, which occurs essentially instantaneously with step 406, a keypad or other icons are displayed on a display device in the vehicle. The display keypad or icons allow a PIN number or access code of the garage door controller to be entered into the vehicular display device. Such display devices are common on many new vehicles and are typically located in the vehicle's instrument panel.

At step 410, an input comprising one or more characters is received from the displayed keypad and provided to a processor. After a number of characters are received, a first test is made at step 412 whether the number of input characters is equal to the length of a pre-stored pre-determined garage access code. If the number of entries by the user does not equal the length of the garage code, at step 413 the method 400 determines whether the input timer started at step 406 expired. If the input timer started at step 406 expired, new inputs to the display device are inhibited, in which case the method 400 proceeds to step 420 where it ends. If the timer has not expired, the method can continue at step 410 whereat information from a displayed keypad is received.

When the number of input characters received at the display device is determined to equal the length of the code stored in memory, as determined at step 412, the method 400 proceeds to step 414 where the characters input to the displayed keypad are compared against a pre-determined code stored in the memory device. If a code or PIN entered at the display device is different from a pre-stored code or PIN, the method 400 again checks at step 413 whether the input timer set at step 406 has expired, in which case the method ends.

If the input timer has not expired, the method 400 allows a person to continue to enter a code or PIN as a "re-attempted" operation of the garage door. If on the other hand the input characters received at the display device identically match the stored PIN number, the method 400 proceeds to step 416 where information from various occupant sensors, described above, is read and compared to historical values in step 418 to determine whether a person is in the car who is authorized to access a garage.

If the occupant sensor information indicates that the person who entered the PIN at a user interface such as a display terminal is not a person who is already known to the vehicle, i.e., the occupant sensor information does not at least substantially correspond to stored values, an alarm message is transmitted to a telematics service provider (TSP). In other embodiments without a telematics transceiver, the method 400 simply stops at step 422.

If the PIN entered at step 414 matches a stored PIN and if the occupant sensors indicate that the person in the vehicle is known to the vehicle, a signal is transmitted to a garage door opener at step 424, which will cause the opener to open or close a garage door and conclude the method 400 at step 422.

The method and apparatus described above and claimed hereinafter overcomes the shortcomings of the prior art, namely the susceptibility of an integrated garage door opener of a vehicle to be operated independently and unsecurely. Stated another way, the method and apparatus disclosed herein prohibits an unauthorized operation of an integrated garage door opener, securing the garage contents and any building associated with it against an unauthorized usage.

The foregoing description is for purposes of illustration only. The true scope of the invention is set forth in the following claims.

What is claimed is:

1. A method of controlling operation of a garage door opener from a vehicle, the method comprising:

receiving an actuation signal from a garage door opener switch located in a vehicle;

displaying a keypad on a touch-sensitive display device that is located in the vehicle, in response to receiving the actuation signal, the keypad configured to accept as input a plurality of alpha-numeric characters of a garage-door-access multi-digit security code;

receiving as input from the keypad displayed on the touch-sensitive display device the garage-door-access multi-digit security code;

receiving occupant-identifying information from at least one occupant sensor, the at least one occupant sensor provides information corresponding to a person's configuration of vehicle control systems and the person's configuration of vehicle control systems is evaluated to identify the person in the vehicle, the occupant sensors include at least one of a seat position detector for measuring seat height, lumbar support position sensor, headrest position sensor, seat angle sensor, seat length for a behind-the-knee bolster sensor, seat title angle sensor, seat forward-back position and occupant weight sensor, steering wheel angle and column length sensors, mirror position sensors, and brake and accelerator pedal height sensors;

comparing the input received at the keypad to a predetermined access code for allowing operation of the garage door opener;

if the input received at the keypad matches the predetermined access code, comparing the received occupant-identifying information to pre-stored occupant-identifying information; and if the received occupant-identifying information corresponds to a previously known occupant, wirelessly transmitting a door open signal from the vehicle to the garage door opener.

2. The method of claim 1, wherein the step of receiving an input from the keypad displayed on the touch-sensitive display device is performed and completed within a first predetermined amount of time after the keypad is displayed on the touch-sensitive display device.

3. The method of claim 1, wherein the step of receiving an input from the keypad displayed on the touch-sensitive display device comprises receiving an input from a keypad that is displayed on a cell phone that is wirelessly coupled to the vehicle by a Bluetooth transceiver.

4. The method of claim 1, wherein the step of receiving an input from the keypad displayed on the touch-sensitive display device comprises receiving a biometric measurement.

5. The method of claim 1, further comprising the step of transmitting an alarm message after determining that an input from the keypad displayed on the touch-sensitive display is invalid.

6. An apparatus for controlling operation of a garage door opener from a vehicle, the apparatus comprising:

a garage door opener transmitter, configured to transmit a wireless signal, which when received by a garage door opener will cause the opener to operate;

a garage door opener control switch;

a touch-sensitive display device, configured to be able to receive a tactile input and display images;

a plurality of occupant sensors including at least one of a seat position detector for measuring seat height, lumbar support position sensor, headrest position sensor, seat angle sensor, seat length for a behind-the-knee bolster sensor, seat title angle sensor, seat forward-back position and occupant weight sensor, steering wheel angle and column length sensors, mirror position sensors, and brake and accelerator pedal height sensors;

a controller coupled to the garage door opener transmitter, the garage door opener control switch, the occupant sensors and coupled to the touch-sensitive display device;

a memory device coupled to the controller and storing executable program instructions for said controller, the instructions being selected and arranged to:

detect an actuation of the garage door opener control switch;

in response to detecting actuation of the garage door opener control switch, cause the display of a keypad on the touch-sensitive display device, the keypad being configured to accept as input a plurality of alphanumeric characters of a garage-door-access multi-digit security code;

receive as input from the touch-sensitive display device the garage-door-access multi-digit security code;

compare the input received from the touch-sensitive display device to a predetermined access code that allows operation of the garage door opener, the predetermined access code being stored in the memory device;

receive and evaluate information from the occupant sensors, wherein the occupant sensors provide information corresponding to a person's configuration of vehicle control systems and wherein the person's configuration of vehicle control systems is evaluated to identify the person in the vehicle; and cause the controller to send signals to the garage door opener transmitter, which cause wireless transmission of a door open signal from the garage door opener transmitter, if the input received from the displayed keypad is determined by the controller to be the same as the predetermined access code and if the occupant sensor information indicates that a person in the vehicle is authorized to access a garage, the door of which is opened and closed by a garage door opener.

7. The apparatus of claim 6, further comprising a biometric scanner coupled to the controller, the biometric scanner being configured to detect a biometric characteristic.

8. The apparatus of claim 6, further comprising a telematics transceiver operatively coupled to the controller, the telematics transceiver being configured to send an alarm signal to a telematics service provider after an invalid input is received from the displayed keypad.

9. The apparatus of claim 6, further comprising a Bluetooth transceiver operatively coupled to the controller, the Bluetooth transceiver being configured to wirelessly couple a cell phone to the apparatus.

10. The apparatus of claim 9, wherein the memory device is configured with additional program instructions, which when executed cause the controller to:

control the Bluetooth transceiver to cause it to transmit the received garage door controller access code to a cell phone coupled to the Bluetooth transceiver.

* * * * *